United States Patent
Ito

(10) Patent No.: US 8,084,090 B2
(45) Date of Patent: Dec. 27, 2011

(54) AQUEOUS INK FOR INKJET RECORDING

(75) Inventor: Yasushi Ito, Wakayama (JP)

(73) Assignee: Kao Corporation, Tokyo (JP)

( * ) Notice: Subject to any disclaimer, the term of this patent is extended or adjusted under 35 U.S.C. 154(b) by 917 days.

(21) Appl. No.: 12/065,517

(22) PCT Filed: Aug. 30, 2006

(86) PCT No.: PCT/JP2006/317115
§ 371 (c)(1),
(2), (4) Date: Apr. 9, 2008

(87) PCT Pub. No.: WO2007/026768
PCT Pub. Date: Mar. 8, 2007

(65) Prior Publication Data
US 2009/0297713 A1  Dec. 3, 2009

(30) Foreign Application Priority Data

Sep. 1, 2005  (JP) .................................. 2005-253425
Sep. 1, 2005  (JP) .................................. 2005-253427

(51) Int. Cl.
*B05D 5/00* (2006.01)
*C09D 11/00* (2006.01)
*B01F 3/12* (2006.01)
*C08L 83/04* (2006.01)

(52) U.S. Cl. .................... 427/256; 106/31.6; 106/31.65; 106/31.67; 516/77; 524/588

(58) Field of Classification Search ............... 427/256; 106/31.6, 31.65, 31.67; 516/77; 524/588
See application file for complete search history.

(56) References Cited

U.S. PATENT DOCUMENTS 6,758,559 B1 * 7/2004 Nakano et al. ................ 347/100

FOREIGN PATENT DOCUMENTS

| JP | 11-12512 | 1/1999 |
| JP | 2000 191967 | 7/2000 |
| JP | 2001 123097 | 5/2001 |
| JP | 2002-20673 | 1/2002 |

OTHER PUBLICATIONS

Office Action issued on May 31, 2011 in the corresponding Japanese Patent Application No. 2005-253425 (with English Translation).
Office Action issued Nov. 9, 2010, in Japanese Patent Application No. 2005-253425 with English translation.

* cited by examiner

*Primary Examiner* — Timothy J. Kugel
(74) *Attorney, Agent, or Firm* — Oblon, Spivak, McClelland, Maier & Neustadt, L.L.P.

(57) ABSTRACT

The present invention relates to (1) a water dispersion for ink-jet printing which includes a self-dispersible pigment (A) containing a salt-forming group and polymer particles (B) containing a constitutional unit derived from a salt-forming group-containing monomer and a constitutional unit derived from a silicone macromer, wherein the polymer particles (B) contain the same salt-forming groups as that contained in and the self-dispersible pigment (A), the water dispersion being excellent in optical density, higher lighter fastness and ejection property; (2) a water-based ink containing the water dispersion; and (3) a method for preventing aggregates from adhering onto an inner surface of nozzles in an ink-jet printing head.

13 Claims, No Drawings

AQUEOUS INK FOR INKJET RECORDING

FIELD OF THE INVENTION

The present invention relates to water dispersions for ink-jet printing, water-based inks for ink-jet printing containing the water dispersions, and a method of preventing aggregates of the ink from adhering onto an inner surface of nozzles in an ink-jet printing system.

BACKGROUND OF THE INVENTION

In ink-jet printing methods, droplets of ink are directly projected onto a recording medium from very fine nozzles and allowed to adhere to the recording medium, to form characters and images. The ink-jet printing methods have been rapidly spread because of their various advantages such as easiness of full coloration, low costs, capability of using a plain paper as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate (for example, refer to Patent Documents 1 and 2).

The Patent Document 1 aims at providing a water-based ink capable of forming clear characters or images printed, exhibiting an excellent weather resistance and ensuring a good printing condition, and discloses such a water-based ink composed of a water dispersion containing a colorant, and vinyl polymer particles obtained by copolymerizing (i) a macromer having a polymerizable functional group, (ii) a polymerizable unsaturated monomer having a salt-forming group and (iii) a copolymerizable monomer, in which the macromer is a silicone macromer and/or a styrene-based macromer having a polymerizable functional group at one terminal end thereof.

The Patent Document 2 aims at providing a water-based ink composition capable of exhibiting excellent water resistance and rubbing resistance as well as high lighter fastness, and a water-based ink for ink-jet printing having an excellent printability, and discloses a water-based ink composition containing an aqueous medium, polymer particles A obtained by incorporating dyes or pigments into a water-insoluble polymer and/or a self-dispersible pigment, and polymer particles B.

Although the conventional inks have been improved in ink characteristics to some extent, these inks still fail to provide fully unsatisfactory inks.

Patent Document 1: JP 2001-254038A
Patent Document 2: JP 2001-329199A

SUMMARY OF THE INVENTION

The present invention relates to the following aspects (1) to (3):

(1) A water dispersion for ink-jet printing which includes a self-dispersible pigment (A) containing a salt-forming group, and polymer particles (B) containing a constitutional unit derived from a salt-forming group-containing monomer (a) and a constitutional unit derived from a silicone macromer (b), wherein the polymer particles (B) contain the same salt-forming group as that contained in the self-dispersible pigment (A);

(2) a water-based ink for ink-jet printing which includes the water dispersion as defined in the above aspect (1); and (3) a method for preventing aggregates from adhering onto an inner surface of nozzles in an ink-jet printing system using polymer particles, wherein a polymer film obtained by applying a water dispersion containing the polymer particles onto a substrate and then drying the water dispersion applied, has a water contact angle of 80° or more.

DETAILED DESCRIPTION OF THE INVENTION

The present invention relates to a water dispersion and a water-based ink for ink-jet printing exhibiting an excellent ejection property while satisfying a high optical density and a high lighter fastness when printed on a plain paper, and a method for preventing aggregates from adhering onto an inner surface of nozzles in an ink-jet printing head.

The present inventors have found that pigments or polymer particles contained in an ink which adhere onto an inner surface of nozzles in an ink-jet printer cause clogging of the nozzles at a tip end thereof, resulting in a poor ejection property of the ink, and found that the above problem can be solved by the present invention.

Also, the present inventors have found the method of preventing aggregates of pigments or polymer particles from adhering onto an inner surface of nozzles in an ink-jet printing system by blending polymer particles having a low surface energy in the ink.

Thus, the present invention relates to the following aspects (1) to (3):

(1) A water dispersion for ink-jet printing which includes a self-dispersible pigment (A) containing a salt-forming group, and polymer particles (B) containing a constitutional unit derived from a salt-forming group-containing monomer (a) and a constitutional unit derived from a silicone macromer (b), wherein the polymer particles (B) contain the same salt-forming group as that contained in the self-dispersible pigment (A);

(2) a water-based ink for ink-jet printing which includes the water dispersion as defined in the above aspect (1); and (3) a method for preventing aggregates from adhering onto an inner surface of nozzles in an ink-jet printing system using polymer particles, wherein a polymer film obtained by applying a water dispersion containing the polymer particles onto a substrate and then drying the water dispersion applied, has a water contact angle of 80° or more.

The water dispersion for ink-jet printing according to the present invention is characterized in that the water dispersion includes a self-dispersible pigment (A) containing a salt-forming group, and polymer particles (B) containing a constitutional unit derived from a salt-forming group-containing monomer (a) and a constitutional unit derived from a silicone macromer (b), wherein the polymer particles (B) contain the same salt-forming group as that contained in the self-dispersible pigment (A).

Also, the method for preventing aggregates from adhering onto an inner surface of nozzles in an ink-jet printing system is characterized by using such polymer particles that a polymer film obtained by applying a water dispersion containing the polymer particles onto a substrate and then drying the water dispersion applied has a water contact angle of 80° or more. In the following descriptions, the respective components of the water dispersion are explained.

Pigment

The polymer particles used in the present invention are preferably used in combination with a pigment in view of enhancing an optical density and a high lighter fastness of characters or images printed as well as inhibiting adhesion of an ink to nozzles and improving an ejection property of the ink.

The pigment used in the present invention may be either organic or inorganic. The organic or inorganic pigment may be used in combination with an extender pigment, if required. Among the pigments, so-called self-dispersible pigments are preferably used.

The organic pigments are preferably used for color water-based inks. Examples of the organic pigments include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The hue of the organic pigments is not particularly limited. In the present invention, there may be used chromatic color pigments such as red-color organic pigments, yellow-color organic pigments, blue-color organic pigments, orange-color organic pigments and green-color organic pigments.

Specific examples of the preferred organic pigments include one or more pigments selected from the group consisting of commercially available products marketed under the tradenames C.I. Pigment Yellow, C.I. Pigment Red, C.I. Pigment Violet, C.I. Pigment Blue and C.I. Pigment Green, etc., with various product numbers.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the extender pigment include silica, calcium carbonate and talc.

Self-Dispersible Pigment

The "self-dispersible pigment" means a pigment onto a surface of which at least one salt-forming group in the form of an anionic or cationic hydrophilic group is bonded either directly or through the other atom group to thereby allow the pigment to be dispersed in an aqueous medium without using a surfactant or a resin.

Examples of the other atom group include an alkylene group having 1 to 24 carbon atoms and preferably 1 to 12 carbon atoms, a substituted or unsubstituted phenylene group and a substituted or unsubstituted naphthylene group.

As the anionic hydrophilic group, any optional groups may be used as long as they exhibit a high hydrophilic property sufficient to allow the pigment particles to be stably dispersed in the aqueous medium. Specific examples of the anionic hydrophilic group include a carboxyl group (—COOM$^1$), a sulfonic group (—SO$_3$M$^1$), a phosphoric group (—PO$_3$M$^1$$_2$), —SO$_2$NH$_2$, —SO$_2$NHCOR$^1$, and dissociated ions thereof such as —COO$^-$, —SO$_3^-$, —PO$_3^{2-}$ and —PO$_3^-$M$^1$.

In the above chemical formulae, M$^1$ may be the same or different. Examples of M$^1$ include a hydrogen atom; alkali metals such as lithium, sodium and potassium; an ammonium group; and organic ammonium groups such as monomethyl ammonium, dimethyl ammonium, trimethyl ammonium, monoethyl ammonium, diethyl ammonium, triethyl ammonium, monomethanol ammonium, dimethanol ammonium and trimethanol ammonium.

R$^1$ is an alkyl group having 1 to 12 carbon atoms, a substituted or unsubstituted phenyl group or a substituted or unsubstituted naphthyl group.

Among these anionic hydrophilic groups, preferred are a carboxyl group (—COOM$^1$) and a sulfonic group (—SO$_3$M$^1$).

Examples of the cationic hydrophilic group include an ammonium group and an amino group. Among these cationic hydrophilic groups, preferred are quaternary ammonium groups represented by the following formula (1):

wherein R$^2$, R$^3$ and R$^4$ are each independently a hydrogen atom or R$^1$ as defined above; X is an anionic group obtained by removing a proton from a halogen atom such as fluorine and chlorine, a carboxylic acid such as acetic acid, propionic acid, lactic acid, glycolic acid, gluconic acid and glyceric acid, or an alkyl sulfate having 1 to 8 carbon atoms, and those group represented by the following formulae:

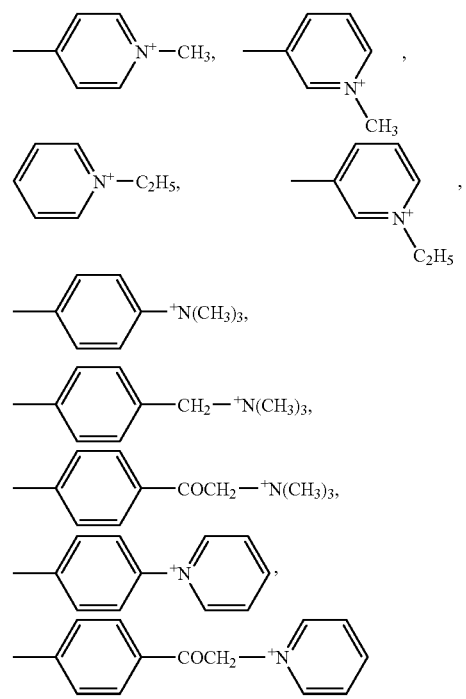

In order to render the pigment self-dispersible, a necessary amount of the above anionic or cationic hydrophilic group may be chemically bonded to a surface of the pigment. The hydrophilic group may be bonded to the surface of the pigment by any optional known method, for example, by the methods described in U.S. Pat. Nos. 5,571,311, 5,630,868 and 5,707,432; J. E. Johnson, "Imaging Science and Technology's 50th Annual Conference (1997)"; Yuan Yu, "Imaging Science and Technology's 53rd Annual Conference (2000)"; and "Polyfile", 1248 (1996).

More specifically, there may be used the method of introducing a carboxyl group into the pigment using compounds, e.g., acids having an oxidizing property such as nitric acid, hydrogen peroxide, hypochlorous acid and chromic acid; the method of introducing a sulfone group into the pigment by thermal decomposition of persulfate compounds; and the method of introducing the above anionic hydrophilic group into the pigment using diazonium compounds containing a carboxyl group, a sulfone group or an amino group, although not limited thereto.

The content of the anionic or cationic hydrophilic group is not particularly limited, and is preferably from 50 to 5,000 μmol/g and more preferably from 100 to 3,000 μmol/g per one gram of the self-dispersible pigment.

The average particle size of the self-dispersible pigment in the water dispersion or the water-based ink is preferably from 40 to 300 nm and more preferably from 50 to 200 nm in view of a good dispersion stability of the resultant dispersion. Meanwhile, the average particle size of the self-dispersible pigment may be measured using a laser particle analyzing system "ELS-8000" (cumulant analysis) available from Otsuka Denshi Co., Ltd. The measurement is conducted at a temperature of 25° C., an angle between incident light and detector of 90° and a cumulative frequency of 100 times by inputting a refractive index of water (1.333) to the analyzing system as a refractive index of the dispersing medium.

Examples of the commercially available self-dispersible pigment (carbon black) include "CAB-O-JET 200" and "CAB-O-JET 300" both available from Cabot Corp., "BONJET CW-1" and "BONJET CW-2" both available from Orient Chemical Industries Co., Ltd., and "Aqua-Black 162" (carboxyl group content: about 800 μmol/g) available from Tokai Carbon Co., Ltd.

These self-dispersible pigments may be used alone or in the form of a mixture of any two or more thereof.

Polymer Particles

The water dispersion for ink-jet printing according to the present invention includes polymer particles in order to enhance an optical density and a high lighter fastness of the resultant ink and attain an excellent ejection property of the ink.

In the method for preventing aggregates from adhering onto an inner surface of nozzles in an ink-jet printing system according to the present invention, it is important that a polymer used in the polymer particles is selected such that a film made of the polymer has a water contact angle of 80° or more.

The contact angle of the polymer film with water may be measured by the method described in Examples below. In view of reducing an affinity (wettability) of the polymer particles to the water-based ink and decreasing a surface energy thereof, the water contact angle of the polymer film is preferably 90° or more, and more preferably 95° or more. The upper limit of the water contact angle of the polymer film is not particularly limited, and the water contact angle of 150° or less is considered to be enough.

On the other hand, in the nozzles of an ink-jet printing head, adhesives and plates made of polyimide resins such as polyether imide are used and exposed to an inner peripheral wall of the respective nozzles. Aggregates derived from the ink are usually gradually attached and deposited onto the surface of the resins. The aggregates are produced when the polymer or pigment being present at a peripheral portion of the nozzles is dried out. Then, the dried-out polymer or pigment is coagulated to form a film-like deposit, thereby causing fluctuation of ejecting direction of ink droplets and finally clogging of a tip end of the nozzles.

In the method for preventing adhesion of aggregates according to the present invention, particles of the polymer having a water contact angle of 80° or more are used in the ink in order to prevent the aggregates from adhering onto an inner surface of nozzles in an ink-jet printing head made of the above heat-resisting resins.

The "polymer particles" used in the present invention mean those polymer particles capable of being dispersed in the form of a polymer emulsion in a solvent including a continuous phase made of an aqueous medium in the presence of or in the absence of a surfactant.

To ensure the effects of the present invention, the polymer particles contain a constitutional unit derived from a salt-forming group-containing monomer (a) and a constitutional unit derived from a silicone macromer (b), and the polymer particles contain the same salt-forming group as that contained in the self-dispersible pigment.

It is considered that the polymer particles containing the constitutional unit derived from the silicone macromer (b) are prevented from adhering onto an inner surface of nozzles in an ink-jet printing head. In addition, it is considered that when the polymer particles contain the same salt-forming group as that contained in the self-dispersible pigment, the polymer particles and the self-dispersible pigment are improved in dispersibility in the ink, resulting in enhancement of an ejection property and an optical density of the ink.

The salt-forming group contained in the polymer particles may be completely the same as that contained in the self-dispersible pigment. Alternatively, the polymer particles may also contain, in addition to the same salt-forming group as that contained in the self-dispersible pigment, the other salt-forming groups unless the inclusion of the other salt-forming groups adversely affects the effects of the present invention.

Among these polymer particles, in view of enhancing an optical property of characters or images printed, preferred are (i) self-emulsifiable polymer particles, and in view of enhancing a high lighter fastness of characters or images printed, preferred are (ii) emulsion polymer particles. These polymer particles may be used alone or in the form of a mixture of any two or more thereof.

(i) Self-Emulsifiable Polymer Particles

The "self-emulsifiable polymer particles (i)" used in the present invention mean particles of a water-insoluble polymer which is kept in an emulsified state when neutralizing a salt-forming group contained in the polymer and charging the neutralized polymer into water without adding any surfactant thereto, followed by stirring or mixing (hereinafter referred to merely as "self-emulsifiable polymer (i)").

Here, the "emulsified state" means such a condition in which a stable emulsified or dispersed state of a mixture produced by mixing and stirring a solution prepared by dissolving 30 g of the water-insoluble polymer in 70 g of an organic solvent such as methyl ethyl ketone, a neutralizing agent capable of neutralizing 100% of the salt-forming group in the water-insoluble polymer (sodium hydroxide for the anionic salt-forming group or acetic acid for the cationic salt-forming group), and 200 g of water with each other at a temperature of 25° C. and a stirring speed of 300 rpm for 30 min, can be confirmed by naked eyes even after the mixture from which the organic solvent is removed is allowed to stand at 25° C. for at least one week.

(Self-Emulsifiable Polymer)

Examples of the self-emulsifiable polymer include water-insoluble vinyl polymers, water-insoluble ester-based polymers and water-insoluble urethane-based polymers. Among these polymers, preferred are water-insoluble vinyl polymers. The "water-insoluble polymer" used herein means a polymer exhibiting a solubility in water of 10 g or lower, preferably 5 g or lower and more preferably 1 g or lower when the polymer is dried at 105° C. for 2 h and then dissolved in 100 g of water at 25° C. The solubility means a solubility in water of the water-insoluble polymer whose salt-forming groups are completely (100%) neutralized with sodium hydroxide or acetic acid according to the kinds of the salt-forming groups to be neutralized.

The water-insoluble vinyl polymer is preferably produced by copolymerizing a monomer mixture containing the salt-forming group-containing monomer (a) (hereinafter occasionally referred to merely as a "component (a)") and the silicone macromer (b) (hereinafter occasionally referred to merely as a "component (b)") and further optionally a hydrophobic monomer (c) (hereinafter occasionally referred to merely as a "component (c)") by a solution polymerization method (the mixture is hereinafter occasionally referred to merely as a "monomer mixture"). The thus produced water-insoluble polymer contains a constitutional unit derived from the component (a) and a constitutional unit derived from the component (b) and further optionally a constitutional unit derived from the component (c).

(Salt-Forming Group-Containing Monomer (a))

The salt-forming group-containing monomer (a) is used for promoting self-emulsification of the polymer particles and enhancing a dispersion stability of the resultant dispersion. Examples of the salt-forming group include a carboxyl group, a sulfonic group, a phosphoric group, an amino group and an ammonium group.

The salt-forming group-containing monomer includes cationic monomers and anionic monomers. Examples of the salt-forming group-containing monomer include those described on page 5, from column 7, line 24 to column 8, line 29 of JP 9-286939A.

Typical examples of the cationic monomers include unsaturated amine group-containing monomers and unsaturated ammonium salt group-containing monomers. Among these cationic monomers, preferred are N,N-dimethylaminoethyl (meth)acrylate, N—(N',N'-dimethylaminopropyl) (meth)acrylamide and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconate. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant ink, preferred are the unsaturated carboxylic acid monomers, and more preferred are acrylic acid and methacrylic acid.

(Silicone Macromer (b))

The silicone macromer (b) is used in view of enhancing an ejection property of the ink. Examples of the preferred silicone macromer include those compounds represented by the following formula (2):

(2)

wherein X is a polymerizable unsaturated group; Y is a divalent bonding group; the plural $R^5$ groups are independently a hydrogen atom, an alkyl group, an aryl group or an alkoxy group; Z is a monovalent residue of a siloxane polymer having a number-average molecular weight of 500 or more; q is 0 or 1; and r is an integer of 1 to 3.

The number-average molecular weight of the silicone macromer is preferably from 500 to 100,000 and more preferably from 1,000 to 10,000, and may be measured by a gel chromatography using chloroform containing 1 mmol/L of dodecyldimethylamine as a solvent and using polystyrene as a standard substance.

Examples of X in the above formula (2) include monovalent unsaturated hydrocarbon groups having 2 to 6 carbon atoms such as $CH_2=CH-$ and $CH_2=C(CH_3)-$.

Examples of Y in the above formula (2) include divalent bonding groups such as $-COO-$, $-COOC_aH_{2a}-$ wherein a is an integer of 1 to 5, and a phenylene group. Among these divalent bonding groups, preferred is $-COOC_3H_6-$.

Examples of $R^5$ in the above formula (2) include a hydrogen atom; alkyl groups having 1 to 5 carbon atoms such as methyl and ethyl; aryl groups having 6 to 20 carbon atoms such as a phenyl group; and alkoxy groups having 1 to 20 carbon atoms such as a methoxy group. Among these groups as $R^5$, preferred is a methyl group. Z is preferably a monovalent residue of a dimethyl siloxane polymer having a number-average molecular weight of from 500 to 5,000. The suffix q is a number of 0 or 1, and preferably 1. The suffix r is an integer of 1 to 3, and preferably 1.

Typical examples of the silicone macromer represented by the above formula (2) include those silicone macromers represented by the following formulae (2-1) to (2-4).

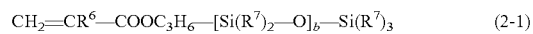
(2-1)

wherein $R^6$ is a hydrogen atom or a methyl group; plural $R^7$ groups are each independently a hydrogen atom or a lower alkyl group having 1 to 5 carbon atoms; and b is a number of 5 to 60.

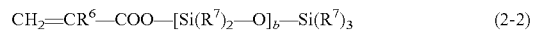
(2-2)

wherein $R^6$, $R^7$ and b have the same meanings as defined above.

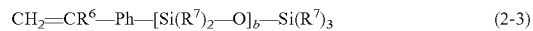
(2-3)

wherein Ph is a phenylene group; and $R^6$, $R^7$ and b have the same meanings as defined above.

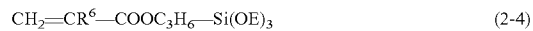
(2-4)

wherein $R^6$ has the same meaning as defined above; and E is a group represented by the formula: $-[Si(R^7)_2-O]-Si(R^7)_3$ wherein $R^7$ has the same meaning as defined above; and c is a number of 0 to 65.

Among these silicone macromers, preferred are those represented by the above formula (2-1), and more preferred are those silicone macromers represented by the following formula (2-1a):

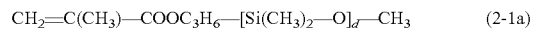
(2-1a)

wherein d is a number of 8 to 40.

Examples of the silicone macromers represented by the above formula (2-1a) include "FM-0711", "FM-0721", "FM-0725" and "TM-0701" (tradenames) all available from Chisso Co., Ltd.

(Hydrophobic Monomer (c))

The hydrophobic monomer (c) is used in view of improving an optical density and a high lighter fastness of the resultant ink. Examples of the hydrophobic monomer include alkyl (meth)acrylates and aromatic group-containing monomers.

The alkyl(meth)acrylates are preferably those containing an alkyl group having 1 to 22 carbon atoms and preferably 6 to 18 carbon atoms. Examples of the alkyl(meth)acrylates include methyl(meth)acrylate, ethyl(meth)acrylate, (iso)propyl(meth)acrylate, (iso- or tertiary-)butyl(meth)acrylate, (iso)amyl (meth)acrylate, cyclohexyl(meth)acrylate, 2-ethylhexyl(meth)acrylate, (iso)octyl(meth)acrylate, (iso)decyl (meth)acrylate, (iso)dodecyl(meth)acrylate and iso)stearyl (meth)acrylate.

Meanwhile, the terms "(iso- or tertiary-)" and "(iso)" used herein mean both the structure in which the groups expressed by "iso" and "tertiary" are present, and the structure in which these groups are not present (i.e., normal). Also, the term "(meth)acrylate" used herein means acrylate, methacrylate or both thereof.

Examples of the preferred aromatic group-containing monomer include vinyl monomers containing an aromatic group having 6 to 22 carbon atoms and more preferably 6 to 12 carbon atoms which may contain a substituent group having a hetero atom. Specific examples of the preferred aromatic group-containing monomer include styrene-based monomers (component (c-1)), and aromatic group-containing (meth)acrylate (component (c-2)).

Examples of the styrene-based monomers (component (c-1)) include styrene, 2-methyl styrene, vinyl toluene, ethylvinyl benzene, vinyl naphthalene and chlorostyrene. Among these styrene-based monomers, preferred are styrene and 2-methyl styrene.

Examples of the aromatic group-containing (meth)acrylate (component (c-2)) include (meth)acrylates containing an arylalkyl group having 7 to 22 carbon atoms, preferably 7 to 18 carbon atoms and more preferably 7 to 12 carbon atoms which may have a substituent group containing a hetero atom, and (meth)acrylates containing an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Specific examples of the aromatic group-containing (meth)acrylate include benzyl(meth)acrylate, phenoxyethyl (meth)acrylate, 2-hydroxy-3-phenoxypropyl acrylate and 2-methacryloyloxyethyl-2-hydroxypropyl phthalate. Among these aromatic group-containing (meth)acrylates, preferred is benzyl(meth) acrylate.

The contents of the components (c-1) and (c-2) in the component (c) are respectively preferably from 10 to 100% by weight and more preferably from 20 to 80% by weight in view of enhancing an optical density and a high lighter fastness of the resultant ink.

Among these components (c), from the viewpoint of improving an optical density and a high lighter fastness of the resultant ink, preferred are the styrene-based monomers (component (c-1)), and more preferred are styrene and 2-methyl styrene. Further, the components (c-1) and (c-2) are preferably used in combination with each other.

(Hydroxyl-Containing Monomer (d))

The monomer mixture may further contain (d) a hydroxyl-containing monomer (hereinafter referred to merely as a "component (d)") for enhancing a dispersion stability of the resultant water dispersion. The component (d) exhibits such an excellent effect of enhancing a dispersibility of the ink and improving a high lighter fastness of the ink merely for a short period of time when printed.

Examples of the component (d) include 2-hydroxyethyl (meth)acrylate, 3-hydroxypropyl(meth)acrylate, polyethylene glycol (n=2 to 30 wherein n represents an average molar number of addition of oxyalkylene groups: this definition is similarly applied to the subsequent descriptions) (meth)acrylate, polypropylene glycol (n=2 to 30) (meth)acrylate and poly(ethylene glycol (n=1 to 15)/propylene glycol (n=1 to 15)) (meth)acrylate. Among these components (d), preferred are 2-hydroxyethyl(meth)acrylate, polyethylene glycol monomethacrylate and polypropylene glycol methacrylate.

The monomer mixture may further contain (e) a monomer (hereinafter occasionally referred to merely as a "component (e)") represented by the following formula (3). The component (e) exhibits an excellent effect of enhancing an ejection stability of the resultant water-based ink and preventing occurrence of slippage of characters or images printed even upon continuous printing.

$$CH_2=C(R^8)COO(R^9O)_pR^{10} \qquad (3)$$

wherein $R^8$ is a hydrogen atom or a lower alkyl group having 1 to 5 carbon atoms; $R^9$ is a divalent hydrocarbon group having 1 to 30 carbon atoms which may contain a hetero atom; $R^{10}$ is a monovalent hydrocarbon group having 1 to 30 carbon atoms which may contain a hetero atom; and p represents an average molar number of addition, and is a number from 1 to 60 and preferably a number from 1 to 30.

In the formula (3), examples of the hetero atom include a nitrogen atom, an oxygen atom, a halogen atom and a sulfur atom.

Examples of the suitable $R^8$ group include methyl, ethyl and (iso)propyl.

Examples of the suitable $R^9O$ group include oxyalkylene groups having 2 to 7 carbon atoms such as an oxymethylene group, an oxy(iso)propylene group, an oxytetramethylene group, an oxyheptamethylene group and an oxyhexamethylene group; and combination of at least two of these oxyalkylene groups.

Examples of the suitable $R^{10}$ group include aliphatic alkyl groups having 1 to 30 carbon atoms and preferably 1 to 20 carbon atoms, aromatic ring-containing alkyl groups having 7 to 30 carbon atoms, and hetero ring-containing alkyl groups having 4 to 30 carbon atoms.

Specific examples of the component (e) include methoxy polyethylene glycol (p in the formula (3): 1 to 30; this is similarly applied to the subsequent descriptions) (meth)acrylate, methoxy polytetramethylene glycol (p=1 to 30) (meth) acrylate, ethoxy polyethylene glycol (p=1 to 30) (meth)acrylate, octoxy polyethylene glycol (p=1 to 30) (meth)acrylate, polyethylene glycol (p=1 to 30) (meth)acrylate 2-ethylhexyl ether, (iso)propoxy polyethylene glycol (p=1 to 30) (meth) acrylate, butoxy polyethylene glycol (p=1 to 30) (meth)acrylate, methoxy polypropylene glycol (p=1 to 30) (meth)acrylate, and methoxy (ethylene glycol/propylene glycol copolymer) (p=1 to 30: among which the number of ethylene glycol constitutional units is 1 to 29) (meth)acrylate. Among these compounds, preferred are octoxy polyethylene glycol (p=1 to 30) (meth)acrylate and polyethylene glycol (p=1 to 30) (meth)acrylate 2-ethylhexyl ether.

Specific examples of commercially available products of the components (d) and (e) include polyfunctional acrylate monomers (NK Esters) available from Shin-Nakamura Kagaku Kogyo Co., Ltd., such as "M-40G", "M-90G", "M-230G" and "EH-4G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300" and "50POEP-800B".

These components (a) to (e) may be respectively used alone or in the form of a mixture of any two or more thereof.

(Contents of Respective Components in Monomer Mixture)

Upon production of the water-insoluble vinyl polymer, the contents of the above components (a) to (e) in the monomer mixture (contents of non-neutralized components; this definition is similarly applied to the subsequent descriptions) or the contents of constitutional units derived from the components (a) to (e) in the water-insoluble polymer are as follows.

The content of the component (a) is preferably from 3 to 40% by weight, more preferably from 5 to 30% by weight and still more preferably from 5 to 20% by weight in view of promoting a self-emulsification of the polymer and enhancing a dispersion stability of the resultant polymer particles.

The content of the component (b) is preferably from 10 to 90% by weight, more preferably from 15 to 80% by weight, still more preferably from 22 to 70% by weight and most preferably from 25 to 65% by weight in view of a good ejection property of the resultant ink.

The content of the component (c) is preferably from 5 to 80% by weight, more preferably from 10 to 60% by weight and still more preferably from 15 to 50% by weight in view of a good optical density and a high lighter fastness of the resultant ink.

The content of the component (d) is preferably from 5 to 40% by weight and more preferably from 7 to 20% by weight in view of a good dispersion stability of the polymer particles and a high lighter fastness of the resultant ink.

The content of the component (e) is preferably from 5 to 50% by weight and more preferably from 10 to 40% by weight in view of a good ejection property of the resultant ink.

The total content of the components (a) and (d) [component (a)+component (d)] in the monomer mixture is preferably from 6 to 60% by weight and more preferably from 10 to 50% by weight in view of a good dispersion stability and a good water resistance of the resultant polymer particles.

The total content of the components (a) and (e) [component (a)+component (e)] in the monomer mixture is preferably from 6 to 75% by weight and more preferably from 13 to 50% by weight in view of a good dispersion stability of the resultant polymer particles and a good ejection stability of the resultant ink.

The total content of the components (a), (d) and (e) [component (a)+component (d)+component (e)] in the monomer mixture is preferably from 6 to 60% by weight and more preferably from 7 to 50% by weight in view of a good dispersion stability of the resultant polymer particles and a good ejection stability of the resultant ink.

Also, the weight ratio of the component (a) to a sum of the components (b) and (c) ((a)/[(b)+(c)]) is preferably from 0.01 to 0.5, more preferably from 0.03 to 0.3 and still more preferably from 0.05 to 0.2 in view of a good long-term storage stability and a good ejection property of the resultant ink.

(Production of Water-Insoluble Polymer)

The water-insoluble polymer capable of providing the self-emulsifiable polymer (i) may be produced by copolymerizing the monomer mixture by known methods such as solution polymerization and bulk polymerization. Among these polymerization methods, preferred is the solution polymerization.

The solvent for the solution polymerization method is preferably an organic polar solvent, although not limited thereto. The organic polar solvent miscible with water may be used in the form of a mixture with water. Examples of the organic polar solvents include aliphatic alcohols having 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide. The amount of the radical polymerization initiator to be used is preferably from 0.001 to 5 mol and preferably from 0.01 to 2 mol per 1 mol of the monomer mixture. The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used, and are therefore not particularly limited. The polymerization is generally conducted at a temperature of preferably from 30 to 100° C. and more preferably from 50 to 80° C. The polymerization time is preferably from 1 to 20 h. The polymerization is preferably conducted in an atmosphere of an inert gas such as nitrogen and argon.

After completion of the polymerization reaction, the polymer thus produced may be isolated from the reaction solution by a known method such as reprecipitation and removal of solvent by distillation. The thus obtained polymer may also be purified by repeated reprecipitation, membrane separation, chromatography, extraction, etc., for removing unreacted monomers, etc., therefrom.

The weight-average molecular weight of the resultant water-insoluble polymer is preferably from 5,000 to 500,000, more preferably from 10,000 to 400,000 and still more preferably from 10,000 to 300,000 in view of a good optical density, a high lighter fastness and a good ejection property of the resultant ink.

Meanwhile, the weight-average molecular weight of the polymer may be measured by a gel chromatography using dimethylformamide containing 60 mmol/L of phosphoric acid and 50 mmol/L of lithium bromide as a solvent and using polystyrene as a standard substance.

Production of Self-Emulsifiable Polymer Particles (i)

The self-emulsifiable polymer particles (i) are preferably produced in the form of a water dispersion from the above water-insoluble polymer through the following steps (1) and (2):

(1) mixing and stirring a mixture containing the water-insoluble polymer, an organic solvent, a neutralizing agent and an aqueous medium; and (2) removing the organic solvent from the resultant mixture.

In the step (1), first, the water-insoluble polymer is dissolved in the organic solvent, and then mixed with the aqueous medium containing the neutralizing agent under stirring to obtain a dispersion of an oil-in-water type. Thus, by adding the water-insoluble polymer to the aqueous medium containing the neutralizing agent, a water dispersion of the fine self-emulsifiable polymer particles (i) exhibiting a higher storage stability can be produced without applying a strong shear force thereto. The method of mixing and stirring the mixture is not particularly limited.

The content of the organic solvent in the mixture is preferably from 10 to 70% by weight, the content of the water-insoluble polymer in the mixture is preferably from 2 to 40% by weight, and the content of the aqueous medium in the mixture is preferably from 10 to 70% by weight.

The degree of neutralization of the water-insoluble polymer is not particularly limited, and preferably controlled such that the finally obtained water dispersion usually exhibits a liquid property ranging from weak acidity to weak alkalinity, for example, a pH of 4 to 10.

In the step (2), the organic solvent is removed from the dispersion obtained in the above step (1) by known methods such as distillation under reduced pressure to render the dispersion aqueous, thereby obtaining a water dispersion of the self-emulsifiable polymer particles (i). The organic solvent is substantially completely removed from the thus obtained water dispersion. The content of the residual organic solvent in the resultant water dispersion is usually 0.1% by weight or lower and preferably 0.01% by weight or lower.

The thus obtained water dispersion of the self-emulsifiable polymer particles (i) has D50 (cumulative 50% value in frequency distribution of scattering intensity which is calculated from the smaller particle size side) of preferably 500 nm or less, more preferably 300 nm or less and still more preferably 200 nm or less in view of a good storage stability of the water dispersion. In addition, the lower limit of D50 is preferably 10 nm or more in view of facilitated production of the water dispersion.

The above water dispersion of the self-emulsifiable polymer particles (i) has D90 (cumulative 90% value in frequency distribution of scattering intensity which is calculated from the smaller particle size side) of preferably 2000 nm or less, more preferably 1000 nm or less and still more preferably 500 nm or less in view of reducing a content of coarse particles in the water dispersion and enhancing a storage stability of the water dispersion. In addition, the lower limit of D90 is preferably 20 nm or more in view of facilitated production of the water dispersion.

Meanwhile, the measurements of D50 and D90 may be conducted using the above laser particle analyzing system "ELS-8000" available from Otsuka Denshi Co., Ltd., under the same conditions as described above.

Emulsion Polymer Particles (ii)

The emulsion polymer particles (ii) used in the present invention mean particles of a polymer obtained by subjecting the monomer mixture to emulsion polymerization in the presence of a surfactant and/or a reactive surfactant (hereinafter referred to merely as the "emulsion polymer"). The monomer mixture preferably contains the above components (a) and (b) and optionally the component (c).

Therefore, the obtained emulsion polymer preferably contains a constitutional unit derived from the above component (a) and a constitutional unit derived from the above component (b) and optionally a constitutional unit derived from the component (c), and may further contain constitutional units derived from the above components (d) and (e).

In the above emulsion polymerization reaction, there may be used any known polymerization initiators. Examples of the polymerization initiators include inorganic peroxides such as hydrogen peroxide, potassium persulfate and ammonium persulfate; organic peroxides such as cumene hydroperoxide, diisopropylbenzene hydroperoxide and p-menthane hydroperoxide; other organic polymerization initiators, e.g., azo-based initiators such as azobisdiisobutyronitrile and methoxybenzene diazomercaptonaphthalene; and redox polymerization initiators using a peroxide or an oxidizing agent in combination with a reducing agent such as sodium hydrogensulfite, sodium thiosulfate, ferrous sulfate and sugars.

The surfactants used in the above emulsion polymerization are not particularly limited, and are preferably anionic surfactants and nonionic surfactants. Examples of the anionic surfactants include sodium dodecylbenzenesulfonate, sodium laurate, and ammonium salts of polyoxyethylene alkyl ether sulfates. Examples of the nonionic surfactants include polyoxyethylene alkyl ethers, polyoxyethylene alkyl esters, polyoxyethylene sorbitan fatty esters, polyoxyethylene alkyl phenyl ethers, polyoxyethylene alkyl amines and polyoxyethylene alkyl amides. These surfactants may be used alone or in the form of a mixture of any two or more thereof.

In the emulsion polymerization, the reactive surfactant is preferably used in view of improving a high lighter fastness of the water dispersion and the water-based ink, or in view of allowing a polymer film formed therefrom to exhibit a water contact angle of 80° or more and preventing formation of aggregates thereof to enhance an ejection property of the water dispersion and the water-based ink.

The reactive surfactant means a surfactant containing one or more radical-polymerizable unsaturated double bonds in a molecule thereof. The reactive surfactant exhibits an excellent emulsifiability for monomers and, therefore, can produce a water dispersion having an excellent stability, resulting in improvement of high lighter fastness and ejection property of the resultant water-based ink.

The reactive surfactant is preferably in the form of an anionic or nonionic surfactant containing at least one hydrophobic group such as linear or branched alkyl or alkenyl groups having 8 to 30 carbon atoms and preferably 12 to 22 carbon atoms, and at least one hydrophilic group such as ionic groups and oxyalkylene groups.

Examples of the alkyl groups include octyl, 2-ethylhexyl, decyl, dodecyl, tetradecyl, hexadecyl, octadecyl and behenyl.

Examples of the alkenyl groups include oleyl and octenyl.

Examples of the ionic groups include cationic groups such as ammonium groups, and anionic groups. Among these ionic groups, preferred are anionic groups, and more preferred are anionic groups such as a carboxyl group, a sulfonic group, a sulfuric group and a phosphoric group and base-neutralized products thereof. The bases used for neutralizing the anionic groups are the same neutralizing agents as exemplified above.

The oxyalkylene groups preferably contain 1 to 4 carbon atoms, and an average polymerization degree of repeating units thereof is preferably from 1 to 100, more preferably from 4 to 80 and still more preferably from 4 to 50. Among these oxyalkylene groups, preferred are an oxyethylene group and/or an oxypropylene group.

When the surfactant contains two or more kinds of oxyalkylene groups, for example, oxyethylene group and oxypropylene group, these groups may be either block-added, random-added or alternate-added. The terminal end group of the oxyalkylene groups is not particularly limited, and may be a hydroxyl group or an alkoxy group such as methoxy and ethoxy.

When the emulsion polymer particles contain a constitutional unit derived from anionic monomers, the reactive surfactant used in the emulsion polymerization preferably contains an anionic group and/or an oxyalkylene group in view of coagulation stability of the polymer particles. When the emulsion polymer particles contain a constitutional unit derived from cationic monomers, the reactive surfactant used in the emulsion polymerization preferably contains an cationic group and/or an oxyalkylene group in view of coagulation stability of the polymer particles.

Specific examples of the reactive surfactants include sulfosuccinic ester-based surfactants represented by the following formulae (4) and (5) such as "LATEMUL S-120P" and "LATEMUL S-180A" both available from Kao Corp., and "ELEMINOL JS-2" available from Sanyo Kasei Kogyo Co., Ltd., and alkyl phenol ether-based surfactants represented by the following formula (6) such as "AQUALON HS-10" and "AQUALON RN-20" both available from Daiichi Kogyo Seiyaku Co., Ltd.

(4)

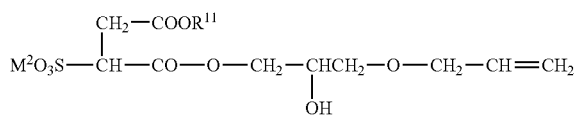

wherein $M^2$ is Na, K or $NH_4$; and $R^{11}$ is an alkyl group having 8 to 18 carbon atoms.

(5)

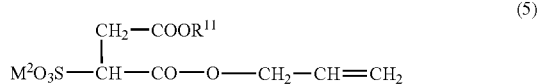

wherein $M^2$ and $R^{11}$ have the same meaning as defined in the above formula (4).

(6)

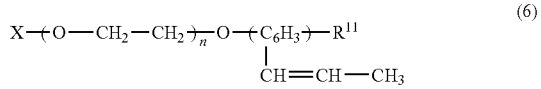

wherein X is H, $SO_3Na$, $SO_3K$ or $SO_3NH_4$; $R^{11}$ has the same meaning as defined in the above formula (4); and n is an integer of 1 to 200 and preferably 1 to 50.

Among these reactive surfactants, preferred are those containing an anionic group represented by the above formulae (4) and (5) in view of facilitated operation of the emulsion polymerization. These reactive surfactants may be used alone or in the form of a mixture of any two or more thereof.

The amount of the reactive surfactant used is usually from 0.1 to 10 parts by weight, preferably from 0.1 to 5 parts by weight and more preferably from 0.1 to 3 parts by weight on the basis of 100 parts by weight of the whole ethylenically unsaturated monomers other than the reactive surfactant. When the amount of the reactive surfactant used is 0.1 part by weight or more, the polymer particles are enhanced in dispersion stability owing to a stable condition thereof, whereas when the amount of the reactive surfactant used is 10 parts by weight or less, the resultant ink is improved in a high lighter fastness.

(Contents of Respective Components and Constitutional Units Derived from Respective Components)

The contents of the above components (a) to (e) in the monomer mixture (contents of non-neutralized components; this definition is similarly applied to the following descriptions) or the contents of the constitutional units derived from the components (a) to (e) in the emulsion polymer (ii) are as follows. That is, the contents of the constitutional units derived from the components other than the component (a) are the same as those in the above self-emulsifiable polymer with respect to aims or applications and suitable ranges thereof. The content of the component (a) in the monomer mixture or the content of the constitutional unit derived from the component (a) in the emulsion polymer is preferably from 0.3 to 10% by weight, more preferably from 0.5 to 5% by weight and still more preferably from 0.5 to 3% by weight in view of a good dispersion stability of the polymer particles.

The solid content of the obtained polymer particles is preferably from 1 to 80%, and, in view of a good stability and a good blendability, more preferably from 10 to 70%.

(Production of Emulsion Polymer Particles (ii))

The emulsion polymer particles (ii) used in the present invention may be produced by known emulsion polymerization methods.

In view of enhancing the film-forming property and the high lighter fastness, the emulsion polymer preferably has a glass transition temperature of 50° C. or lower and preferably 30° C. or lower. Further, the glass transition temperature of the emulsion polymer is preferably −70° C. or higher and more preferably −40° C. or higher in view of enhancing a strength and a high lighter fastness of a coating film obtained therefrom.

In the water dispersion and the water-based ink, the D50 (cumulative 50% value in frequency distribution of scattering intensity which is calculated from the smaller particle size side) of the emulsion polymer particles (ii) is not particularly limited as long as the resultant ink is kept stable upon storage thereof. The D50 of the emulsion polymer particles is preferably from 5 to 300 nm and more preferably from 30 to 200 nm as measured at 25° C. using the above laser particle analyzing system "ELS-8000" (cumulant analysis) available from Otsuka Denshi Co., Ltd.

Water Dispersion and Water-Based Ink

The polymer particles used in the present invention are preferably contained in the water dispersion and the water-based ink. The water-based ink of the present invention is an ink containing the water dispersion of the present invention and using water as a main solvent.

The water dispersion and the water-based ink of the present invention are respectively produced by mixing the pigment (self-dispersible pigment), the polymer particles and water with each other. The order of mixing of the respective components is optional. The contents of the pigment (self-dispersible pigment), the polymer particles and water in the water dispersion and the water-based ink for ink-jet printing are as follows.

The content of the pigment (self-dispersible pigment) is preferably from 1 to 15% by weight, more preferably from 2 to 10% by weight and still more preferably from 2 to 8% by weight in view of a good stability, a good optical density and a good ejection property of the water dispersion and the water-based ink.

The content of the polymer particles is preferably from 0.5 to 15% by weight, more preferably from 1 to 12% by weight and still more preferably from 2 to 10% by weight in view of a good stability, a high lighter fastness, a good effect of preventing adhesion of aggregates and a good ejection property of the water dispersion and the water-based ink.

The weight ratio of the pigment (self-dispersible pigment) to the polymer particles [pigment (self-dispersible pigment)/polymer particles] is preferably from 20/80 to 90/10 and more preferably from 30/70 to 80/30 in view of a good optical density, a high lighter fastness and a good ejection property of the resultant water dispersion and water-based ink.

The content of water in the water dispersion and the water-based ink is preferably from 30 to 90% by weight and more preferably from 40 to 80% by weight.

The water-based ink of the present invention may further contain various additives such as wetting agents, dispersants, defoaming agents, mildew-proof agents and chelating agents, if required. Also, the pH of the water-based ink is preferably from 4 to 10.

The surface tension of the water dispersion of the present invention is preferably from 30 to 65 mN/m and more preferably from 35 to 60 mN/m as measured at 20° C., and the surface tension of the water-based ink of the present invention is preferably from 25 to 50 mN/m and more preferably from 27 to 45 mN/m as measured at 20° C.

The viscosity of the water dispersion having a solid content of 10% by weight is preferably from 2 to 6 mPa·s and more preferably from 2 to 5 mPa·s as measured at 20° C. to produce a water-based ink having a good viscosity. The viscosity of the water-based ink is preferably from 2 to 12 mPa·s and more preferably from 2.5 to 10 mPa·s in order to maintain a good ejection property thereof.

Ink-Jet Printing Method

The ink-jet printing method used in the present invention is not particularly limited. The ink-jet printing method may be either a piezoelectric type or a thermal type, and is especially preferably the piezoelectric type.

The water-based ink of the present invention can exhibit an excellent ejection property even when applied to a high-speed inkjet printing method.

In the method for preventing adhesion of aggregates according to the present invention, by using the polymer particles having a water contact angle of 80° or more, preferably 90° or more and more preferably 95° or more, it is possible to effectively prevent aggregates of the polymer particles from adhering onto an inner surface of nozzles in an ink-jet printing head even when printed at a high speed.

For this reason, in accordance with the present invention, an ejecting direction of ink droplets can be maintained constant, resulting in enhanced linearity of the ejected ink droplets and, therefore, a good ejection property of the ink.

In addition, even though the aggregates are attached onto the inner surface of nozzles, the resultant deposits can be removed from the inner surface of nozzles owing to a self-cleanability of the ink itself (deposit dissolvability). Therefore, the ink droplets ejected can be prevented from suffering from fluctuation of their impact points on a recording medium, resulting in formation of excellent characters or images printed having a less "slippage" (thin white stripes on a solid printed image) or a less "lack" (thick white stripes on a solid printed image).

EXAMPLES

In the following production examples, examples and comparative examples, the "part(s)" and "%" represent "part(s) by weight" and "% by weight", respectively, unless otherwise specified.

Production Example 1

Production of Emulsion Polymer Particles Using Reactive Surfactant

One hundred grams of a monomer mixture containing acrylic acid (a)/a silicone macromer (b) (tradename "FM-0711" available from Chisso Co., Ltd.)/styrene (c)/2-ethylhexyl acrylate (c) at a mixing ratio of Feb. 29, 1949/20, 10 g of a reactive surfactant (tradename "LATEMUL S-180A" available from Kao Corporation; sulfosuccinic ester-based surfactant; effective ingredient content: 50%), 0.5 g of potassium persulfate and 50 g of water were charged into a beaker, and the resultant mixture was stirred by a homomixer, thereby preparing a uniform opaque white solution.

Next, a glass reactor equipped with a stirrer, a thermometer, a reflux condenser and a nitrogen feed tube was charged with 300 g of ion-exchanged water, 2.3 g of the above "LATEMUL S-180A" and 0.1 g of potassium persulfate, and then purged with nitrogen. The reactor was then placed in a water bath to heat the contents of the reactor to 70° C. Next, the above-prepared opaque white solution was dropped into the reactor over 2 h, and then the contents of the reactor were aged at 80° C. for 2 h, thereby obtaining a dispersion of polymer particles having a solid content of 29%. As a result of the measurement, it was confirmed that D50 of the thus obtained polymer particles was 90 nm.

Meanwhile, the measurement of D50 was conducted at 25° C. using a laser particle analyzing system "ELS-8000 (product number)" available from Otsuka Denshi Co., Ltd.

Production Example 2

Production of Self-Emulsifiable Polymer Particles

Twenty parts of methyl ethyl ketone and 0.01 part of a chain transfer agent (2-mercaptoethanol) together with 10% of 200 parts of a monomer mixture containing methacrylic acid (a)/a silicone macromer (b) (tradename "FM-0711" available from Chisso Co., Ltd.)/butyl acrylate (c) at a mixing weight ratio of 10/60/30 were charged into a reaction vessel and mixed with each other, and then the reaction vessel was fully purged with a nitrogen gas to thereby obtain a mixed solution.

Separately, remaining 90% of the monomer mixture was charged into a dropping funnel, and further 0.27 part of the chain transfer agent, 60 parts of methyl ethyl ketone and 1.2 parts of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h from completion of the dropping, a solution prepared by dissolving 0.3 part of the radical polymerization initiator in 5 parts of methyl ethyl ketone was added to the obtained reaction solution, and the resultant solution was further aged at 65° C. for 2 h and then at 70° C. for 2 h to obtain a polymer solution. Next, the thus obtained polymer solution was mixed with a given amount of methyl ethyl ketone under stirring to obtain a polymer solution having a solid content of 50%. As a result, it was confirmed that the weight-average molecular weight of the thus obtained polymer was about 30,000.

Thirty parts of the thus obtained polymer solution was mixed with 40 parts of methyl ethyl ketone and 30 parts of acetone under stirring to prepare a uniform solution. The thus obtained solution was charged into a dropping funnel, and dropped into a reaction vessel filled with a mixture previously prepared by mixing 4.3 parts of a 5 mol/L sodium hydroxide aqueous solution, 1.2 parts of a 25% ammonia aqueous solution and 217.5 parts of ion-exchanged water with each other, over 30 min to neutralize the polymer solution. Further, the mixture was stirred for 30 min to obtain an emulsion composition. The thus obtained emulsion composition was heated at 60° C. under reduced pressure to remove the organic solvent and ammonia together with a part of water therefrom. The composition was further passed through a filter having an average pore size of 5 μm (available from Nippon Pole Co., Ltd.) to remove coarse particles therefrom, thereby obtaining a water dispersion of polymer particles having a solid content of 20%. As a result of the measurement, it was confirmed that D50 of the thus obtained polymer particles was 48 nm.

Production Example 3

Production of Emulsion Polymer Particles Using Reactive Surfactant

The same procedure as defined in Production Example 1 was repeated except for using a monomer mixture containing acrylic acid (a)/styrene (c)/2-ethylhexyl acrylate (c) at a mixing weight ratio of 2/49/49, thereby obtaining polymer particles. As a result of subjecting the thus obtained polymer particles to the same measurement as conducted in Production Example 1, it was confirmed that D50 of the thus obtained polymer particles was 120 nm.

Production Example 4

Production of Self-Emulsifiable Polymer Particles

The same procedure as defined in Production Example 2 was repeated except for using a monomer mixture containing methacrylic acid (a)/butyl acrylate (c) at a mixing weight ratio of 10/90, thereby obtaining polymer particles. As a result of subjecting the thus obtained polymer particles to the same measurement as conducted in Production Example 1, it was confirmed that D50 of the thus obtained polymer particles was 35 nm.

Examples 1 to 3 and Comparative Examples 1 to 4

A water dispersion of a self-dispersible carbon black (solid content of pigment: 7 parts), a water dispersion containing the polymer particles obtained in Production Examples 1 to 3 (solid content of the polymer particles: 3 parts), glycerol (5 parts), 2-pyrrolidone (5 parts), isopropyl alcohol (2 parts), "ACETYLENOL EH" (1 part) available from Kawaken Fine Chemicals Co., Ltd., and water (balance) were mixed with each other under stirring at 25° C. to obtain 100 parts in total of a dispersion. The thus obtained dispersion was filtered through a 0.8 µm-mesh filter to obtain a water-based ink.

The thus obtained water-based ink was evaluated by the following methods to examine (1) adhesion of aggregates onto an inner surface of ink-jet nozzles, (2) an ejection property, (3) an optical density and (4) a high lighter fastness thereof. Further, water dispersions containing the respective polymer particles obtained in Examples and Comparative Examples were formed into a film, and the resultant polymer films were subjected to measurement of a water contact angle. The results are shown in Table 1.

Meanwhile, any of the self-dispersible carbon blacks shown in Table 1 were in the form of a water dispersion thereof, and the symbols used in Table 1 respectively represent the following products:

"CW-2": "BONJET CW-2" (tradename) available from Orient Kagaku Kogyo Co., Ltd.; solid content: 15%; salt-forming group: carboxyl group.

"Cab": "Cab-O-Jet 200" (tradename) available from Cabot Specialty Chemicals Inc.; solid content: 20%; salt-forming group: sulfonic group.

(1) Water Contact Angle of Polymer Film

The water contact angle of the polymer film was measured as follows. That is, the water dispersion of the polymer particles (solid content: 20% by weight; 1 g) was applied onto a glass plate (20 cm$^2$) in a coating amount of 0.01 g/cm$^2$, and allowed to stand at a temperature of 25° C. and a relative humidity of 50% for 24 h for drying, thereby forming a uniform coating film. One droplet of purified water was dropped on the thus formed coating film to measure a contact angle between the purified water and the film at a temperature of 25° C. and a relative humidity of 50% using a contact angle meter "CA-D Model" available from Kyowa Interface Science Co., Ltd. Meanwhile, a sheet glass "Water Slide Glass" (tradename; manufactured by Matsunami Glass Industry, Co., Ltd.; model name: S7224; standard: Preclean (degreased and cleaned) cut-off, size: 26 mm in width×76 mm in length× 1.2-1.5 mm in thickness) was used as the glass plate. The solid content and coating amount of the water dispersion of the polymer particles may be appropriately controlled as long as the coating amount of the polymer per unit area was the above-specified value.

(2) Adhesion of Aggregates onto Inner Surface of Nozzles

Using a polyamide film (about 20 cm$^2$; "UPILEX 25S" available from Ube Kosan Co., Ltd.) as a material similar to an inner part material of the nozzles, the ink (about 1 g) was uniformly applied thereonto and allowed to stand at 25° C. under a relative humidity of 50% for 24 h for drying. The obtained coated film was immersed in the same ink filled in a beaker at 25° C. for 1 h, and then lightly washed with purified water to measure a residual ink on the film.

[Evaluation Criteria]

◯: Residual ink remained over less than 10% of ink-applied area;

Δ: Residual ink remained over not less than 10% but less than 50% of ink-applied area; and X: Residual ink remained over not less than 50% of ink-applied area.

(3) Ejection Property

Solid image printing was carried out on a high-quality coated paper available from Canon Corp., using an ink-jet printer "Model EM-930C" (piezoelectric type) available from Seiko Epson Co., Ltd., under the printing condition set to Fine Mode (high-speed printing mode). After drying, the printed image was observed by naked eyes to evaluate an ejection property of the ink according to the following evaluation criteria.

Meanwhile, the "slippage" means the condition in which no nozzles causing ink ejection failure are present, but thin white stripes are formed on the printed solid image, whereas the "lack" means the condition in which nozzles causing ink ejection failure are present, and thick white stripes are formed on the printed solid image.

[Evaluation Criteria]

◯: No slippage nor lack;

Δ: Slippage occurred;

X: Both slippage and lacks occurred.

(4) Optical Density

Solid image printing was carried out on a recycled paper for PPC available from Nippon Kakoseisi Co., Ltd., using the above ink-jet printer. The thus printed paper was naturally dried at room temperature for 24 h, and then the optical density thereof was measured by a Macbeth densitometer "RD918" (product number) available from Gretag-Macbeth Corp.

[Evaluation Criteria]

◯: Optical density: 1.40 or more

Δ: Optical density: not less than 1.35 but less than 1.40

X: Optical density: less than 1.35

(5) High Lighter Fastness

Text printing was carried out on a recycled paper for PPC commercially available from Nippon Kakoseisi Co., Ltd., using the above inkjet printer, and after passage of 3 min and 10 min, the extent of staining of the printed sample when traced with an aqueous fluorescent marker "OPTEX 1" (tradename) commercially available from Zebra Co., Ltd., was observed with naked eyes, and the evaluation was made on the basis of the following evaluation criteria.

[Evaluation Criteria]

◉: No staining such as rubbed stains was observed when traced with a fluorescent marker.

◯: Some rubbed stains were generated when traced with a fluorescent marker, but at a level without practical problems.

Δ: Generation of rubbed stains were observed when traced with a fluorescent marker.

X: Generation of rubbed stains were remarkably observed over a whole surface traced with a fluorescent marker, which is intolerable.

TABLE 1-1

| | Composition of water dispersion | | | |
|---|---|---|---|---|
| | Component (A) | | Polymer particles (B) | |
| Kind | Salt-forming group | Production Example | Polymerization method | Salt-forming group |
| Example 1 | CW-2 | Carboxyl group | Production Example 1 | Emulsion polymerization | Carboxyl group |
| Example 2 | CW-2 | Carboxyl group | Production Example 2 | Solution polymerization | Carboxyl group |
| Example 3 | CW-2 | Carboxyl group | Production Example 1 Production Example 2 | Emulsion polymerization Solution polymerization | Carboxyl group |
| Comparative Example 1 | CW-2 | Carboxyl group | — | — | — |
| Comparative Example 2 | CW-2 | Carboxyl group | Production Example 3* | Emulsion polymerization | Carboxyl group |
| Comparative Example 3 | CW-2 | Carboxyl group | Production Example 4* | Solution polymerization | Carboxyl group |
| Comparative Example 4 | Cab | Sulfonic group | Production Example 3* | Emulsion polymerization | Carboxyl group |

Note:
Numerals in parentheses appearing in the column of "Optical density" represent values measured.
In Example 3, the polymer particles obtained in Production Examples 1 and 2 were each used in an amount of 1.5 parts by weight.
*Containing no constitutional unit derived from the silicone macromer.

TABLE 1-2

| | Evaluation | | |
|---|---|---|---|
| | Water contact angle of polymer film (°) | Adhesion of aggregates | Ejection property |
| Example 1 | 102 | ○ | ○ |
| Example 2 | 96 | ○ | ○ |
| Example 3 | 97 | ○ | ○ |
| Comparative Example 1 | — | ○ | ○ |
| Comparative Example 2 | 67 | X | X |
| Comparative Example 3 | 63 | X | X |
| Comparative Example 4 | 67 | X | X |

TABLE 1-3

| | Evaluation | | |
|---|---|---|---|
| | | High lighter fastness | |
| | Optical density | After 3 min | After 10 min |
| Example 1 | ○ (1.44) | ◉ | ◉ |
| Example 2 | ○ (1.42) | ○ | ◉ |
| Example 3 | ○ (1.43) | ◉ | ◉ |
| Comparative Example 1 | ○ (1.45) | X | X |
| Comparative Example 2 | ○ (1.43) | ○ | ◉ |
| Comparative Example 3 | Δ (1.36) | Δ | ○ |
| Comparative Example 4 | X (1.33) | X | ○ |

From the results shown in Table 1, it was confirmed that the water-based inks for ink-jet printing obtained in the above Examples exhibited a high optical density and were excellent in high lighter fastness and ejection property even when printed on a plain paper.

Also, it was confirmed that in the Examples according to the present invention, adhesion of aggregates of the inks to an inner surface of nozzles was prevented, and the inks were excellent in ejection property as well as optical density and high lighter fastness (in particular, after the elapse of 10 min) even when printed on a plain paper.

Further, characters or images printed with the inks obtained Examples 2 and 3 were also excellent in gloss when printed on a commercially available coated paper (photographic paper <glossy>; "KA450PSK" available from Seiko Epson Co., Ltd.).

INDUSTRIAL APPLICABILITY

The water-based ink containing the water dispersion for ink-jet printing according to the present invention, exhibits a high optical density and were excellent in high lighter fastness and ejection property even when printed on a plain paper.

More specifically, in the water-based ink of the present invention, the pigment and polymer particles contained in the ink are prevented from adhering onto an inner surface of ink-jet nozzles. Even though adhesion of the ink is caused, the deposits of the ink are removed from the inner surface of the nozzles owing to a self-cleanability (deposit dissolvability) of the ink itself, thereby preventing occurrence of "slippage" and "lack" due to clogging of a tip end of the nozzles.

In addition, in the method for preventing adhesion of aggregates according to the present invention, aggregates of the ink are prevented from adhering onto an inner surface of nozzles in an ink-jet printing head, resulting in improved linearity of ink droplets ejected and, therefore, a good ejection property of the ink.

Even though aggregates of the ink adhere onto an inner surface of the nozzles, the deposits of the ink are removed from the inner surface of the nozzles owing to a self-cleanability (deposit dissolvability) of the ink itself, so that fluctuation of impact points of ink droplets on a recording medium is prevented, thereby obtaining good characters or images printed having a less "slippage" and a less "lack".

The invention claimed is:

1. A water dispersion for ink-jet printing comprising a self-dispersible pigment (A) comprising a salt-forming group, and polymer particles (B) comprising a constitutional unit derived from a salt-forming group-containing monomer (a) and a constitutional unit derived from a silicone macromer (b), wherein the polymer particles (B) comprise the same salt-forming groups as that comprised in the self-dispersible pigment (A).

2. The water dispersion for ink-jet printing according to claim 1, wherein the self-dispersible pigment (A) is carbon black.

3. The water dispersion for ink jet printing according to claim 1, wherein the salt-forming group is a carboxyl group.

4. The water dispersion for ink jet printing according to claim 1, wherein a content of the constitutional unit derived from the silicone macromer (b) in the polymer particles (B) is from 10 to 90% by weight.

5. The water dispersion for ink jet printing according to claim 1, wherein the polymer particles (B) are self-emulsifiable polymer particles.

6. The water dispersion for ink-jet printing according to claim 1, wherein the polymer particles (B) are emulsion polymer particles.

7. The water dispersion for ink jet printing according to claim 1, wherein a weight ratio of the self-dispersible pigment (A) to the polymer particles (B) is from 20/80 to 90/10.

8. A water-based ink for ink-jet printing comprising the water dispersion as defined in claim 1.

9. A method for preventing aggregates from adhering onto an inner surface of nozzles in an ink jet printing system with polymer particles, the method comprising applying a water dispersion comprising the polymer particles onto a substrate and then drying the applied water dispersion, thereby obtaining a polymer film which has a water contact angle of 80° or more, wherein the polymer particles comprise a constitutional unit derived from a salt-forming group-containing monomer (a) and a constitutional unit derived from a silicone macromer (b).

10. The method according to claim 9, wherein the polymer particles are combined with at least one pigment.

11. The method according to claim 9, wherein a content of the constitutional unit derived from the silicone macromer (b) in the polymer particles is from 10 to 90% by weight.

12. The method according to claim 9, wherein the polymer particles are self-emulsifiable polymer particles.

13. The method according to claim 9, wherein the polymer particles are emulsion polymer particles.

* * * * *